United States Patent
Biro

(10) Patent No.: US 9,296,484 B2
(45) Date of Patent: Mar. 29, 2016

(54) RESTRAINTS PRINCIPALLY FOR INFLATABLE EVACUATION SYSTEMS

(75) Inventor: Robert J. Biro, Brick, NJ (US)

(73) Assignee: Air Cruisers Company, Wall Township, NJ (US)

( * ) Notice: Subject to any disclaimer, the term of this patent is extended or adjusted under 35 U.S.C. 154(b) by 107 days.

(21) Appl. No.: 13/364,410

(22) Filed: Feb. 2, 2012

(65) Prior Publication Data

US 2013/0200217 A1     Aug. 8, 2013

(51) Int. Cl.
*B64D 25/14* (2006.01)
*B63B 23/00* (2006.01)
*B63B 27/14* (2006.01)

(52) U.S. Cl.
CPC ............... *B64D 25/14* (2013.01); *B63B 23/00* (2013.01); *B63B 2027/145* (2013.01)

(58) Field of Classification Search
CPC .... Y10S 244/905; B64D 25/14; B63B 23/00; B63B 2027/145
USPC .............. 182/48; 114/362; 441/30, 40, 90; 193/25 R; 244/905, 137.2; 192/25 B
See application file for complete search history.

(56) References Cited

U.S. PATENT DOCUMENTS

| | | | | |
|---|---|---|---|---|
| 3,391,771 | A * | 7/1968 | Day | 193/25 A |
| 3,463,266 | A * | 8/1969 | Day | 182/48 |
| 3,897,861 | A * | 8/1975 | Miller et al. | 193/25 B |
| 4,460,062 | A * | 7/1984 | Fisher | 182/48 |
| 4,516,944 | A * | 5/1985 | Hirobumi et al. | 441/40 |
| 4,519,782 | A * | 5/1985 | Fisher | 441/40 |
| 4,567,977 | A * | 2/1986 | Fisher | 193/25 B |
| 5,360,186 | A * | 11/1994 | Danielson et al. | 244/137.2 |
| 5,711,495 | A * | 1/1998 | Danielson | 244/137.2 |
| 5,871,180 | A * | 2/1999 | Hublikar | 244/137.2 |
| 5,906,340 | A * | 5/1999 | Duggal | 244/137.2 |
| 5,975,467 | A * | 11/1999 | O'Donnell et al. | 244/137.2 |
| 6,902,453 | B2 * | 6/2005 | Switlik et al. | 441/90 |
| 2004/0094361 | A1 * | 5/2004 | Gronlund et al. | 182/48 |

* cited by examiner

*Primary Examiner* — Daniel Cahn
(74) *Attorney, Agent, or Firm* — Kilpatrick Townsend & Stockton LLP; Dean W. Russell, Esq.

(57) ABSTRACT

Detailed are restraints intended principally (but not necessarily exclusively) for inflatable evacuation slides or rafts. At least one such restraint may be designed to release based on geometric shape of an object (such as a slide) rather than merely as a function of its inflation pressure or length. One version of this type of restraint includes a connector pin attached to a cord, with tensioning of the cord eventually retracting the pin to effect release of the restraint.

5 Claims, 3 Drawing Sheets

RESTRAINTS PRINCIPALLY FOR INFLATABLE EVACUATION SYSTEMS

FIELD OF THE INVENTION

This invention relates to restraints for inflatable materials and more particularly, although not necessarily exclusively, to temporary restraints for inflatable evacuation slides or rafts of the types often installed on aircraft or other vessels or on drilling platforms or other building structures.

BACKGROUND OF THE INVENTION

Inflatable evacuation slides typically are provided as means for emergency egress from aircraft or other people-containing structures. Controlling deployment of these slides so as to allow them to function correctly in emergency situations is thus of especial importance. Deployment control may be difficult in certain circumstances, however; as an example, if extended fully while only slightly inflated, a slide may be vulnerable to wind deflection repositioning its distal end such that the slide is unsuitable for passenger transit even when more completely inflated. Conversely, controls that prevent adequate inflation of a slide likewise would be problematic.

Conventionally, assemblies of cords and wires, referred to as frangible links, have been used for deployment control. Such a link is placed between proximal and distal ends of a folded, uninflated slide. As the slide inflates, it attempts to unfold but is restrained by the link. Further inflation eventually tensions the wire past its breaking point, at which time the slide may fully unfold for use.

U.S. Pat. No. 4,460,062 to Fisher describes another restraint system for evacuation slides designed especially for installation in the upper deck of a Boeing 747 aircraft. It replaces the frangible links described above with shear pins. The Fisher '062 patent also details a secondary restraint in the form of a cord laced in a lanyard knot, which cord unlaces upon contact with an inflatable bag. U.S. Pat. No. 4,567,977 to Fisher discloses an alternate secondary restraint including a piston and coil spring.

U.S. Pat. No. 5,711,495 to Danielson illustrates yet another restraint system for inflatable evacuation slides. This system of the Danielson patent provides friction braking means incorporating spooled webbing. As stated in the patent: "Unrolling of the webbing from the spool permits the controlled extension of the inflated tubes until the full extension of the length of webbing occurs, at which time the webbing pulls free from the spool resulting in the full release of the particular fold being restrained." See Danielson, col. 4, 11. 26-30 (numerals omitted).

SUMMARY OF THE INVENTION

The present invention provides alternate restraints to those of the Fisher '062 and '977 patents and the Danielson patent. Unlike the restraints of the two Fisher patents, for example, some restraints of the present invention do not release as a direct function of pin breaking strength or internal slide pressure. Moreover, unlike the restraints of the Danielson patent, the present restraints do not incorporate spooled webbing releasing as a function of slide length. Instead, at least one restraint of the present invention releases based on the geometric shape of a partially-inflated slide or raft, restraining a distal section of a slide until the slide has unfolded to a particular angle (or range of angles).

Certain presently-preferred versions of slide restraints utilize a frangible link connecting proximal and middle sections of the slide as well as an assembly comprising a strap and a moveable pin connecting the middle section and the distal section. As the slide inflates, the middle section and distal section of the slide unfold from the proximal section but are restrained by the frangible link. Eventually, inflation pressure causes breakage of the frangible link, permitting further separation of the proximal and middle sections.

The strap and pin assembly restrain the position of the distal section of the slide relative to the middle section until the pin retracts, which in turn frees an end of the strap. Retraction of the pin may occur via tension placed on a lanyard (or other cord or connector) connecting the pin to the proximal section of the slide. Whereas the lanyard initially is slack when the slide is folded, inflation of the slide starts to tension the lanyard. Preferably, however, the lanyard retains at least some slack until the frangible link is broken, so that the pin remains in place. Following breakage of the link, however, the lanyard tenses, triggering retraction of the pin and consequent separation of the distal section from the middle section.

Although frangible links and strap and pin assemblies comprise presently—preferred restraints, other types of restraints may be employed instead or additionally. Similarly, although preferred placements of the restraints are as described above, restraints may be placed elsewhere instead or additionally (including on each side of a slide). Indeed, persons skilled in relevant fields of endeavor will understand that multiple types and placements of restraints may occur within the scope of the present invention.

It thus is an optional, non-exclusive object of the present invention to provide restraints for expandable materials.

It is an additional optional, non-exclusive object of the present invention to provide restraints designed principally for use with inflatable evacuation slides or rafts.

It is another optional, non-exclusive object of the present invention to provide restraints releasable based, at least in part, on the geometric shape of an object (such as an inflatable evacuation slide).

It is a further optional, non-exclusive object of the present invention to provide restraints releasable upon triggering by tension of a lanyard.

It is, moreover, an optional, non-exclusive object of the present invention to provide systems of restraints including both one or more frangible links and one or more assemblies of straps and pins.

Other objects, features, and advantages will be apparent to those skilled in relevant fields of endeavor with reference to the remaining text and the drawings of this application.

DETAILED DESCRIPTION

Figure 2:
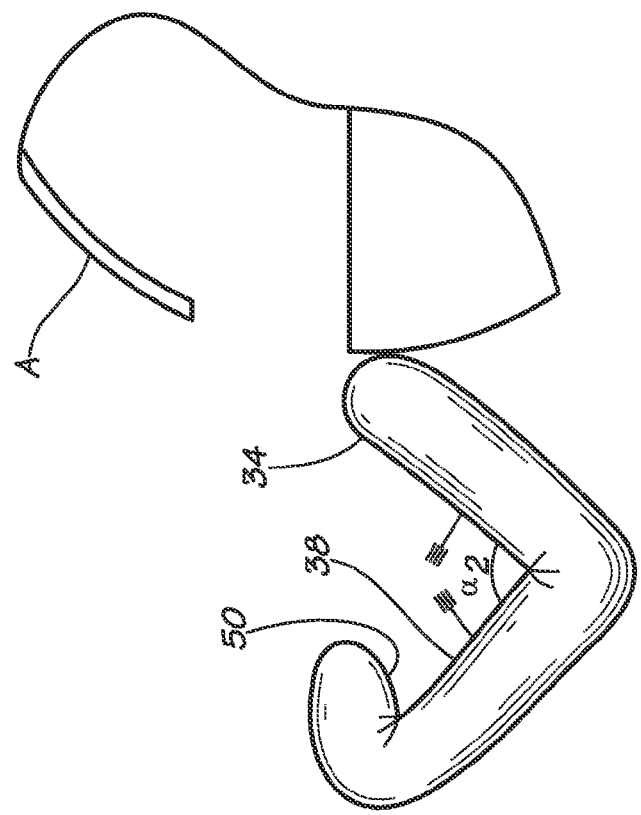
FIG. 2 is a schematic representation of the slide and restraint of FIG. 1 shown with the slide at a second stage of deployment.
Figure 1:
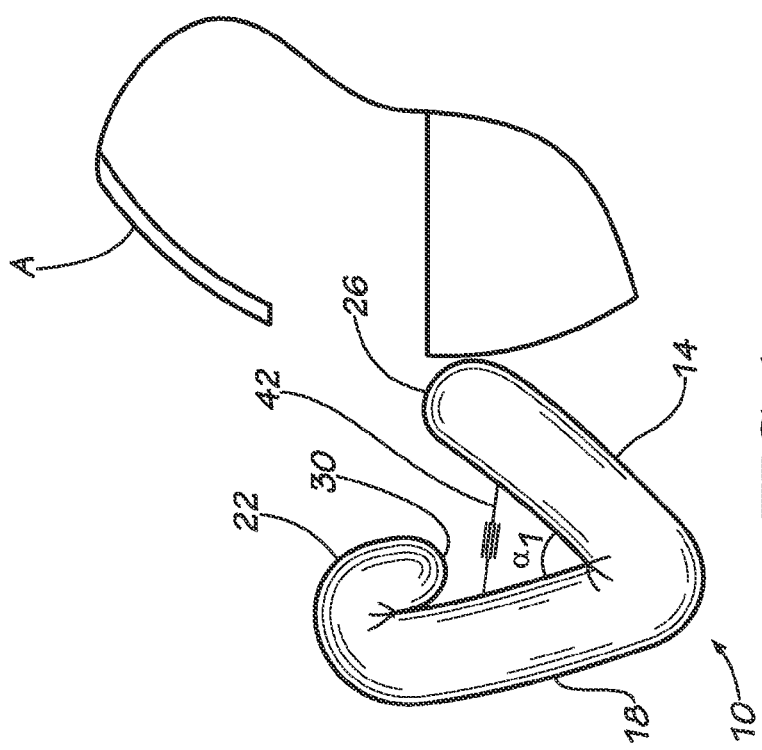
FIG. 1 is a schematic representation of an inflatable evacuation slide and an associated first type of restraint, with the slide shown at a first stage of deployment.
Figure 3:
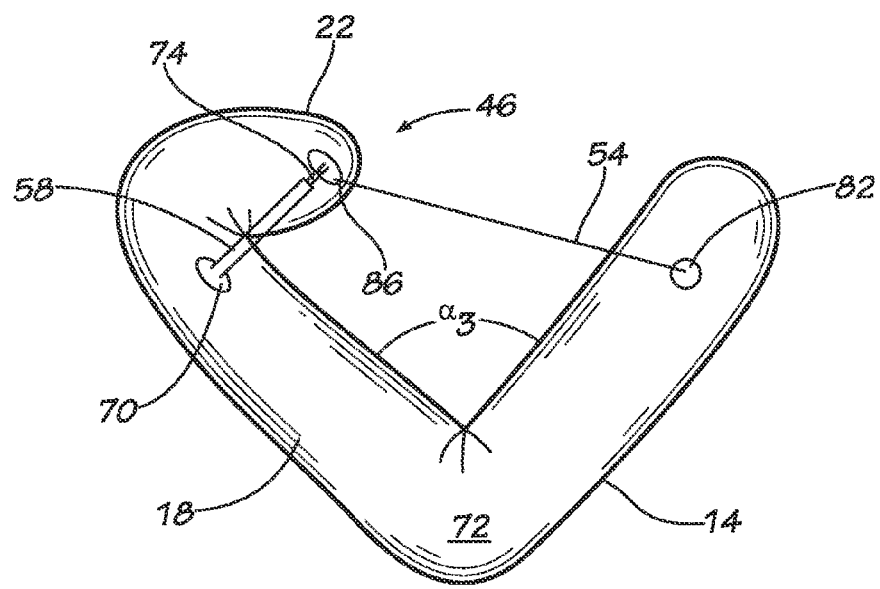
FIG. 3 is a schematic representation of the slide of FIG. 1 and portions of an associated second type of restraint, with the slide shown at approximately the second stage of deployment.
Figure 4:
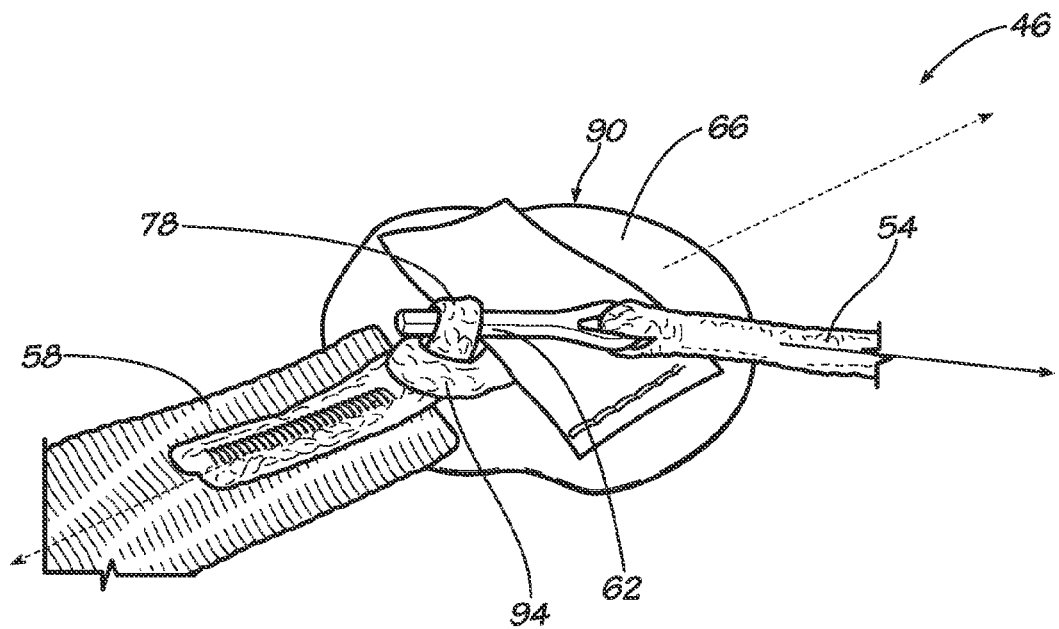
FIG. 4 illustrates the second type of restraint shown in a first position.

Schematically illustrated in FIGS. 1-3 is exemplary slide 10 together with a portion of an aircraft A. Slide 10 preferably is an inflatable emergency evacuation slide of the sort commonly installed on commercial and military passenger and cargo aircraft. Slide 10 need not necessarily be so, however; instead, it may allow evacuation of ships or other vessels, drilling platforms, buildings, or other structures. Alternatively, slide 10 may be a raft, a combined slide and raft, or any object having suitable characteristics useable in conjunction with the present invention.

Versions of slide 10 may be installed (in aircraft or otherwise) in conventional manners. If installed in aircraft A, slide 10 typically would be folded into a small volume and packed within or adjacent an exit door. If needed to permit evacuation of aircraft A, slide 10 could be inflated automatically or manually, with the inflation forcing the slide 10 to unfold (among other things) as its volume increases.

As schematically depicted in FIGS. 1-3, slide 10 may include proximal section 14, middle section 18, and distal section 22. (Of course, other versions of such a slide may comprise more or fewer sections.) Nevertheless, depicted slide 10 includes at least these sections, with proximal section 14 defining a "head," or proximal end 26 typically designed to remain attached to aircraft A when slide 10 is deployed. By contrast, distal section 22 defines a "toe," or distal end 30, when slide 10 is deployed.

FIG. 1 illustrates slide 10 at a first stage of deployment. At this stage, upper surfaces 34 and 38 of respective proximal and middle sections 14 and 18 remain connected by restraint 42, which may (but need not necessarily) be or include a frangible link. Inflation of slide 10, however, has progressed such that middle section 18 has unfolded to an angle $\alpha_1$ from proximal section 14. Restraint assembly 46 (see FIGS. 3-6) continues to connect upper surface 38 to upper surface 50 of distal section 22 at this first stage of deployment.

A second stage of deployment of slide 10 is shown in FIG. 2. At this stage, slide 10 has inflated sufficiently to cause unfolding of middle section 18 from proximal section 14 to an angle $\alpha_2$ (where $\alpha_2 > \alpha_1$), at which point restraint 42 releases or otherwise becomes non-functional (as, for example, by breakage of a frangible link) and middle section 18 can begin to unfold more fully from proximal section 14.

Unfolding of middle section 18 from proximal section 14 to angle $\alpha_2$ (or approximately so) also may trigger release of restraint assembly 46 so as to allow distal section 22 to begin unfolding from middle section 18. FIG. 3 schematically details portions of restraint assembly 46 immediately prior to its release, with cord or lanyard 54 approaching maximum tension when middle section 18 has unfolded from proximal section 14 to an angle $\alpha_3$. Presently preferred is that the value of angle $\alpha_3$ exceed that of angle $\alpha_2$, so that restraint 42 releases before restraint assembly 46 does. Persons skilled in the art will, however, recognize that the values of these angles need not necessarily be ordered such that $\alpha_3 > \alpha_2 > \alpha_1$.

Additional components of exemplary restraint assembly 46 are illustrated in FIGS. 3-6. Beyond lanyard 54, assembly 46 may include strap 58, pin 62, and connector 66. In at least some versions of slide 10, strap 58 comprises webbed nylon, pin 62 is a parachute pin, and connector 66 is a loop of cord. Persons skilled in the art will recognize that other materials and objects may be employed instead, however.

As shown principally in FIG. 3, first end 70 of strap 58 may be attached to middle section 18 along side 72 of slide 10. Such attachment may occur in any suitable manner as, for example, by a ring and patch assembly bonded to middle section 18. Second end 74 of strap 58 is not fixed to any portion of slide 10, instead terminating with loop 78.

First end 82 of lanyard 54 may be attached—again in any suitable manner—to proximal section 14 along side 72. Connected appropriately to its second end 86 may be pin 62, consistent with FIGS. 4-6. Like second end 74, second end 86 is not fixed to any portion of slide 10.

Connector 66 advantageously is fixed to distal section 22 of slide 10. It may comprise, for example, at least patch 90 bonded to distal section 22 and from which loop 94 protrudes. Loop 94 is designed to receive loop 78, which in turn receives pin 62.

For installation, uninflated slide 10 may be folded at least so that upper surface 50 contacts or is proximate upper surface 38 and upper surface 38 contacts or is proximate upper surface 34. Loop 78 may be fitted through loop 94 of connector 66, following which pin 62 may be fitted through loop 78. Because in the folded state of slide 10 the distance between connector 66 and first end 82 of lanyard 54 is less than the length of the lanyard 54, lanyard 54 remains slack, consistent with FIG. 4.

Figure 5:
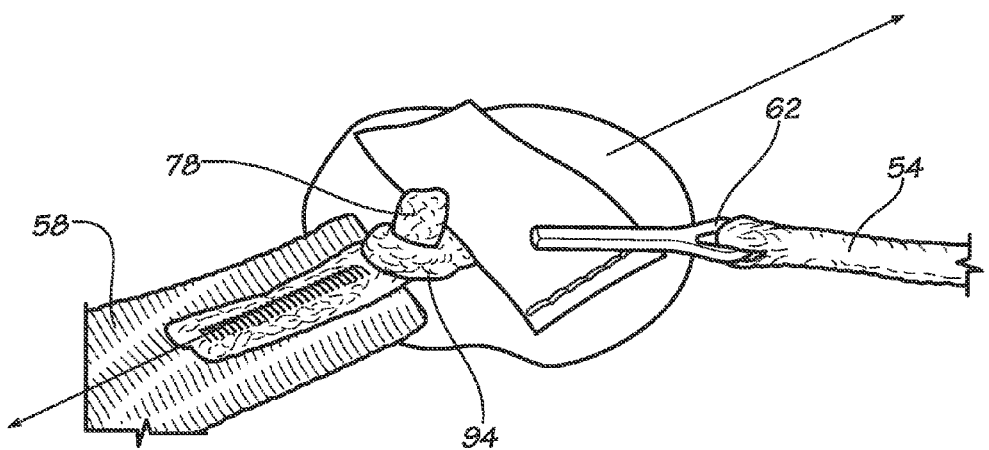
FIG. 5 illustrates the second type of restraint shown in a second position.
Figure 6:
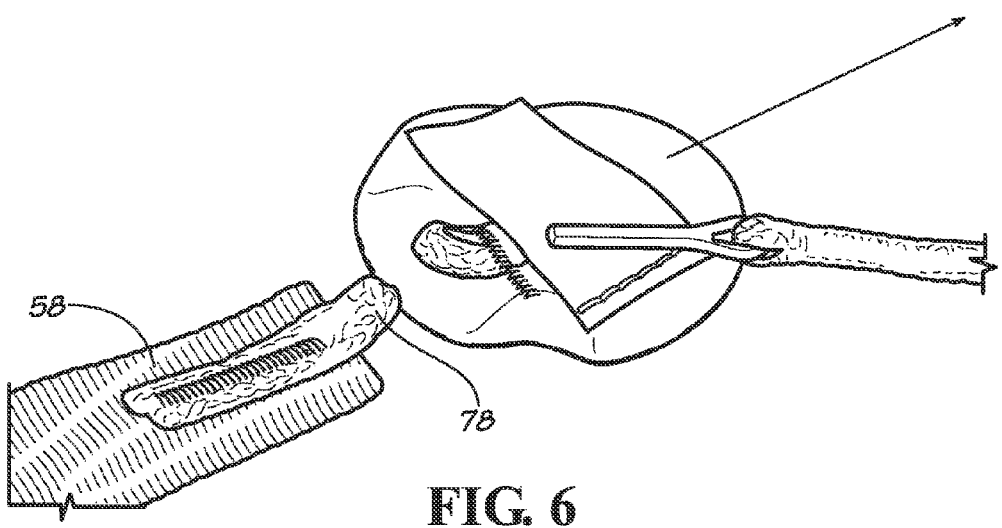
FIG. 6 illustrates the second type of restraint shown in a third position.

Upon deployment slide 10 inflates and, as noted above, commences unfolding. When middle section 18 has unfolded from proximal section 14 to an angle $\alpha_3$, lanyard 54 becomes taut and slides out of, and thus retracts from, loop 78, as illustrated in FIG. 5. With pin 62 removed from loop 78, further inflation causes the loop 78 to slide out of, and thus retract from, loop 94 (FIG. 6), fully releasing restraint assembly 46. Thus, merely by varying the length of lanyard 54, assembly 46 may be made to release at different values of angle $\alpha_3$ as necessary or desired.

The foregoing is provided for purposes of illustrating, explaining, and describing embodiments of the present invention. Modifications and adaptations to these embodiments will be apparent to those skilled in the art and may be made without departing from the scope or spirit of the invention. Contents of the Fisher '062 and '977 patents and of the Danielson patent are incorporated herein in their entireties by this reference.

What is claimed is:

1. An inflatable evacuation object selected from the group consisting of a slide and a raft, wherein the inflatable evacuation object is capable of being folded, at least in part, prior to deployment and comprises:
   a. a first section;
   b. a second section capable of being folded relative to the first section prior to deployment;
   c. a third section capable of being folded relative to the second section prior to deployment, the second section contiguous with and directly connected between the first and third sections;
   d. a first restraint assembly (i) contacting each of the first, second, and third sections, (ii) comprising a component having length, and (iii) configured to release as a function of an angle to which the second section has unfolded relative to the first section during deployment of the inflatable evacuation object, based at least in part on the length of the component; and
   e. a second restraint assembly (i) contacting each of the first and second sections and (ii) configured to release prior to release of the first restraint assembly during deployment of the inflatable evacuation object.

2. An inflatable evacuation object according to claim 1 in which the component is a lanyard (a) having a first end connected to the first section, (b) having a second end terminating in a pin, and (c) which is capable of being slack prior to deployment of the inflatable evacuation object.

3. An inflatable evacuation object according to claim 2 in which the first restraint assembly further comprises a strap having an end terminating in a first loop configured to receive the pin prior to deployment of the inflatable evacuation object.

4. An inflatable evacuation object according to claim 3 in which the first restraint assembly further comprises a connector comprising a second loop for receiving the first loop.

5. An inflatable evacuation object according to claim 1 in which the second restraint assembly comprises a frangible link.

\* \* \* \* \*